United States Patent

Iwamoto

[11] Patent Number: 6,141,685
[45] Date of Patent: Oct. 31, 2000

[54] DIGITAL INFORMATION SUPPLY AND MANAGEMENT SYSTEM

[75] Inventor: Koji Iwamoto, Narashi, Japan

[73] Assignee: Matsushita Electric Industrial Co., Ltd., Japan

[21] Appl. No.: 08/931,285

[22] Filed: Sep. 16, 1997

[30] Foreign Application Priority Data

Sep. 19, 1996 [JP] Japan .................................. 8-247612

[51] Int. Cl.⁷ ...................... G06F 15/173; G06F 15/17; G06F 13/38
[52] U.S. Cl. .......................................... 709/224; 709/230
[58] Field of Search .................................... 709/200, 202, 709/203, 223, 224, 229, 219, 230; 705/21, 32, 39

[56] References Cited

U.S. PATENT DOCUMENTS

| | | | |
|---|---|---|---|
| 5,388,211 | 2/1995 | Hornbuckle | 705/32 |
| 5,418,713 | 5/1995 | Allen | 705/32 |
| 5,634,012 | 5/1997 | Stefik et al. | 705/39 |
| 5,732,218 | 3/1998 | Bland et al. | 709/224 |
| 5,857,190 | 1/1999 | Brown | 709/219 |

OTHER PUBLICATIONS

Wilkinson, J.H.; "Packetised stream formats for the SDTI"; The EBU–SMPTE Task Force: Building an infrastructure for Managing Compressed Video Systems, (#1997/382) IEE Colloquium; pp. 1011–10/7, Dec. 5, 1997.

*Primary Examiner*—Mark H. Rinehart
*Assistant Examiner*—Marc D. Thompson
*Attorney, Agent, or Firm*—Parkhurst & Wendel, L.L.P.

[57] ABSTRACT

There is provided a digital information supply and management system comprising a supply unit, a management unit, and a terminal unit, in which digital information including digital video and audio information is supplied from the supply unit to the terminal unit, and the management unit manages utilization of the digital information in the terminal unit. In this system, the supply unit comprises digital information generating means for generating the digital information; management information generating means for generating management information for the digital information; and information synthesis means for synthesizing the digital information and the management information to generate synthetic information. The management unit comprises accumulating means for receiving reported contents from the terminal unit. The terminal unit comprises receiving means for receiving the synthetic information supplied from the supply unit; management information separating means for separating the management information from the synthetic information; management information processing means for processing the management information; report contents storage means for storing contents to be reported to the management unit, corresponding to the management information; and operating means for accepting an operation by a user to the digital information. Therefore, the contents to be reported to the management unit can be limited by making the management information have instructions relating to report of the contents from the terminal unit to the management unit. As a result, the management unit requires no storage means, leading to a reduction in work load for analysis.

5 Claims, 13 Drawing Sheets

| operating means 103 | clock function 106 |
|---|---|
| operation | time |
| Reproduce CH1 | April, 1st  08:00:05 - 08:30:10 |
| Reproduce CH2 | April, 1st  08:30:10 - 09:30:15 |
| Reproduce CH1 | April, 1st  11:58:00 - 12:15:20 |
| Copy CH1 | April, 1st  12:30:00 - 13:30:00 |
| Reproduce CH2 | April, 1st  20:00:07 - 21:30:30 |
| Reproduce CH1 | April, 2nd  06:02:10 - 08:25:24 |

| operating means 103 operation | clock function 106 time |
|---|---|
| Reproduce CH1 | April, 1st 08:00:05 - 08:30:10 |
| Reproduce CH2 | April, 1st 08:30:10 - 09:30:15 |
| Reproduce CH1 | April, 1st 11:58:00 - 12:15:20 |
| Copy CH1 | April, 1st 12:30:00 - 13:30:00 |
| Reproduce CH2 | April, 1st 20:00:07 - 21:30:30 |
| Reproduce CH1 | April, 2nd 06:02:10 - 08:25:24 |

Prior Art

Fig.13 (a)

| operating means 103 | clock function 106 |
|---|---|
| operation | time |
| Reproduce CH1 | April, 1st 08:00:05 - 08:30:10 |
| Reproduce CH2 | April, 1st 08:30:10 - 09:30:15 |
| Reproduce CH1 | April, 1st 11:58:00 - 12:15:20 |
| Copy CH1 | April, 1st 12:30:00 - 13:30:00 |
| Reproduce CH2 | April, 1st 20:00:07 - 21:30:30 |
| Reproduce CH1 | April, 2nd 06:02:10 - 08:25:24 |

Fig.13 (b)

```
PLAY  CH1  4108:00:05  4108:30:10

PLAY  CH2  4108:30:10  4109:30:15

PLAY  CH1  4111:58:00  4112:15:20

COPY  CH1  4112:30:00  4113:30:00

PLAY  CH2  4120:00:07  4121:30:30

PLAY  CH1  4206:02:10  4208:25:24
```

DIGITAL INFORMATION SUPPLY AND MANAGEMENT SYSTEM

FIELD OF THE INVENTION

The present invention relates to a digital information supply and management system that supplies digital information including digital video and audio information to a terminal unit and manages utilization of the digital information in the terminal unit.

BACKGROUND OF THE INVENTION

With recent developments in multimedia devices such as personal computers for domestic use, information communication media such as CATV (community antenna television system), and mass storage information media such as CD and optical disk, the importance of digital information in which video, audio, and text data, or data for control and management are equally treated, has increased.

Digital information including video and audio information is supplied to general users at home, office and the like via communication and broadcasting media or recording media such as a disk. In order to meet needs of the users, many suppliers want to know how the digital information supplied are utilized (hereinafter referred to as utilization states).

When information is unilaterally supplied from the supplier to the users, the supplier can know the utilization states only by means like questionnaires. Hence, to perform 'supply' and 'management' as a system and to automatically collect the utilization states are suitable for grasping the utilization states efficiently and firmly and for performing a supply in which the utilization states are reflected. Hereinafter, such a management system according to a prior art will be described using figures.

FIG. 11 is a block diagram illustrating a structure of an information management system according to a prior art. As shown in the figure, this information management system comprises a supply unit 10, a terminal unit 20, and a management unit 50. The supply unit 10 supplies digital information, such as video information, audio information, video and audio information, and text data. In the terminal unit 20, the digital information supplied is operated and utilized by the user. The management unit 50 accumulates the contents of operations performed to the digital information in the terminal unit 20.

The supply unit 10 comprises a digital information generating means 100 for generating digital information, and an output means 101 for outputting the digital information. Reference numeral 30 designates a first transmission medium capable of transmitting digital information, and this is implemented by any of a radio wave medium such as satellite broadcasting or ground broadcasting, a cable such as CATV, and a packaged recording medium such as a disk.

The terminal unit 20 comprises a receiving means that receives the digital information, and an operating means 103 that accepts operations by the user, for example, user's selecting desired information from the received digital information, viewing and listening to the information, or copying the information. The terminal unit 20 further comprises a clock function 106 that provides the present time, a measuring means 104 that measures the operational contents of the operating means 103 with the time shown by the clock function 106, an operation storage means 107 that stores the measuring result, and a reporting means 105 that reports the measuring result to the management unit 50.

The management unit 50 comprises an accumulating means 108 that receives the measuring result from the terminal unit 20, and a total accumulated contents storage means 110 that receives the result of the accumulation from the accumulating means 108 and stores the result as accumulated contents. Reference numeral 40 designates a second transmission medium connecting the reporting means 105 in the terminal unit 20 with the accumulating means 108 in the management unit 50, and this is implemented by a communication line such as a telephone line.

A description is given of the operation of the system mentioned above, from formation of digital information to accumulation of utilization states of the digital information.

In the supply unit 10, the digital information generating means 100 generates digital information, and the output means 101 outputs the digital information through the transmission medium 30 to the terminal unit 20. When the digital information is received by the receiving means 102 in the terminal unit 20, the user can operate and use the digital information in the terminal unit 20.

FIG. 12 is a flowchart showing the procedure of measuring the operational contents performed to the digital information, and reporting and accumulating the result of the measurement.

The user of the terminal unit 20 selects desired digital information and performs a desired operation to the digital information, for example, reproduction, viewing and listening, or recording, using the control means 103. In step 100 of FIG. 12, it is judged whether the user has operated the digital information. In step 101, when the digital information has been operated in step 100, the measuring means 104 obtains the operational content and the time shown by the clock function 106. In step 102, the operation storage means 107 stores the operational content and the time. For example, when the user has performed operations as shown in FIG. 13(a), the contents stored in the operation storage means 107 are as shown in FIG. 13(b). In step 103, it is judged whether or not the reporting means 105 is instructed to report the contents by the accumulating means 108 through the transmission medium 40. Until the instruction is made, the above-mentioned steps 100 to 103 are repeated.

When the instruction to report the contents is made in step 103, step 104 is executed, wherein the reporting means 105 reports the contents stored in the operation storage means 107 to the accumulating means 108. In step 105, the accumulating means 108 temporarily stores the contents in the total accumulated contents storage means 110 and then analyzes the accumulated contents.

As mentioned above, the contents of operations performed to the digital information (e.g. video information, audio information, video and audio information, and text data) supplied from the supply unit 10 and transmitted through the transmission medium 20 are reported to the accumulating means 108 in the management unit 50 by the reporting means 105, and finally, these contents are analyzed and managed.

In the information management system mentioned above, the operational contents of the operating means 103 and the time are uniformly measured by the measuring means 104 in the terminal unit 20 and reported to the accumulating means 108 in the management unit 50.

Since the accumulated operational contents are simply enumerated as shown in FIG. 13(b), when the user wants to extract a specific operation such as 'copy', the corresponding operational content is extracted after storing all of the measuring results in the total accumulate contents storage means 110 in the management unit 50. In this case, since a large quantity of data from plural terminal units are stored in the total accumulated contents storage means 110 as shown in FIG. 13(b), a mass storage means and much labor are required for analysis.

Furthermore, it is necessary to investigate the operational contents to be accumulated by checking the operating times of the operational contents with a digital information output time table, such as a program table. When a scheduled output time table or the like is changed in the supply unit 10, there is a possibility that such an investigation cannot be executed or that a problem occurs in propriety of findings.

Furthermore, when the user wants to change the digital information to be output according to the analysis result obtained in the management unit 50, the user must manually change the digital information in the supply unit 10 with reference to the analysis result. This work requires much labor and time.

SUMMARY OF THE INVENTION

It is an object of the present invention to provide a digital information supply and management system that can reduce the work load for analysis in the management unit and provide accurate analysis result.

It is another object of the present invention to provide a digital information supply and management system that can dispense with a storage means for accumulated contents in the management unit, by limiting items to be accumulated in the supply unit.

It is still another object of the present invention to provide a digital information supply and management system that can rapidly change digital information to be output according to the analysis result obtained in the management unit, by feeding back the analysis result to the supply unit.

It is yet another object of the present invention to provide a digital information supply and management system that can instruct about utilization of digital information and management thereof, such as accumulation, when the digital information is supplied.

It is a further object of the present invention to provide a digital information supply and management system that can prevent digital information from being stolen or altered during information interchange for management.

It is a still further object of the present invention to provide a digital information supply and management system that can realize flexible utilization of digital information, relating to division of the digital information or reproduction procedure thereof, when the digital information is supplied.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a digital information supply and management system comprising a supply unit, a management unit, and a terminal unit, in which digital information including digital video and audio information is supplied from the supply unit to the terminal unit, and the management unit manages utilization of the digital information in the terminal unit. The supply unit comprises a digital information generating means for generating the digital information; management information generating means for generating management information for the digital information; and information synthesis means for synthesizing the digital information and the management information to generate synthetic information. The management unit comprises accumulating means for receiving reported contents from the terminal unit. The terminal unit comprises receiving means for receiving the synthetic information supplied from the supply unit; management information separating means for separating the management information from the synthetic information; management information processing means for processing the management information; report contents storage means for storing contents to be reported to the management unit, corresponding to the management information; and operating means for accepting an operation by a user to the digital information. Therefore, the contents to be reported to the management unit can be limited by making the management information have instructions relating to report of the contents from the terminal unit to the management unit. As a result, the management unit requires no storage means, leading to a reduction in work load for analysis.

According to a second aspect of the invention, in the above-mentioned system, the management unit further comprises accumulated contents stored means for storing reported contents from the terminal unit. Therefore, in addition to the above-mentioned effects, flexible accumulation is possible by utilizing reported contents about plural items.

According to a third aspect of the present invention, in the above-mentioned system, the management information generating means included in the supply unit is connected with the accumulating means included in the management unit through a transmission medium. Therefore, the analysis results obtained in the management unit can be fed back to the supply unit in a short time, whereby the supply of the digital information can be changed efficiently, reliably, and rapidly, with the user's needs reflected therein.

According to a fourth aspect of the present invention, in the above-mentioned system, the management information consists of a header part and a detailed information part, and the detailed information part includes a digital information operation management information part relating to contents of an operation to the digital information. Therefore, instructions for flexible utilization and management of the digital information can be transmitted as management information to the terminal unit.

According to a fifth aspect of the present invention, in the above-mentioned system, at least a portion of the management information is encrypted, and the header part includes an encryption information part relating to the encryption. Therefore, the encryption prevents the digital information from being stolen or altered.

According to a sixth aspect of the present invention, in the above-mentioned system, the header part includes a digital information division information part relating to division of the digital information into plural sub-areas. Therefore, flexible utilization of the digital information is possible.

According to a seventh aspect of the present invention, in the above-mentioned system, the header part includes a digital information sub-area reproduction procedure information part that designates plural reproduction procedures in the terminal unit for the respective sub-areas into which the digital information is divided according to the digital information division information part. Therefore, in addition to division of the digital information, reproduction of the sub-areas of the digital information can be instructed, resulting in more flexible utilization of the digital information.

BRIEF DESCRIPTION OF THE DRAWINGS

FIGS. 13(a) and 13(b) are diagrams for explaining information management by the conventional device.

DETAILED DESCRIPTION OF THE PREFERRED EMBODIMENTS

Embodiment 1

Figure 1:
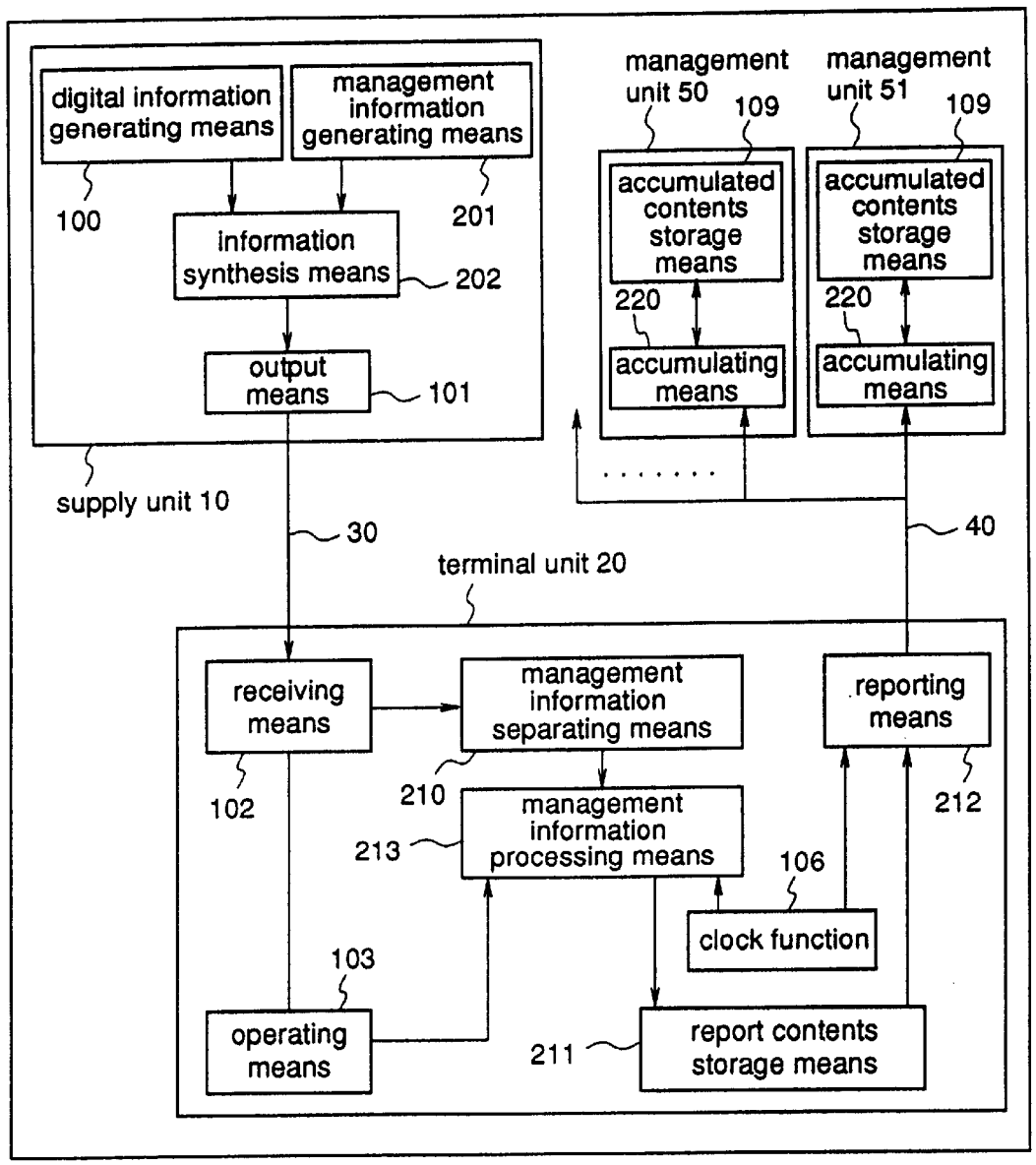
FIG. 1 is a block diagram illustrating a structure of a digital information supply and management system according to a first embodiment of the invention.

FIG. 1 is a block diagram illustrating a structure of a digital information supply and management system according to a first embodiment of the present invention. As shown in FIG. 1, the digital information supply and management system comprises a supply unit 10 that outputs digital information such as video and audio information and text data, a transmission medium 30 that transmits the output digital information, a terminal unit 20 that receives the transmitted digital information, first and second management units 50 and 51 that accumulate contents of operations performed to the digital information, and a second transmission medium 40 that connects the terminal unit 20 with the management units 50 and 51. The transmission media 30 and 40 are identical to those employed for the conventional system. In this first embodiment, it is premised that the medium 30 is a radio wave and the medium 40 is a telephone line.

The supply unit 10 comprises a digital information generating means 100 that generates digital information, a management information generating means 201 that generates information for managing contents of operations performed to the digital information, an information synthesis means 202 that generate synthetic information by synthesizing the digital information and the management information, and an output means 101 that outputs the synthetic information.

Among the constituents of the terminal unit 20, a receiving means 102, an operating means 103, and a clock function 106 are identical to those already described for the conventional system and, therefore, do not require description. In addition to these constituents, the terminal unit 20 comprises a management information separating means 210 that separates the management information from the synthetic information received by the receiving means 102, a management information processing means 213 that processes the management information, a report contents storage means 211 that stores contents to be reported to the management units 50 and 51, and a reporting means 212 that sends the contents to be reported to the management units 50 and 51.

Each of the management units 50 and 51 comprises an accumulating means 220 that receives the reported contents from the terminal unit 20, and an accumulated contents storage means 109 that stores the reported contents. The first management unit 50 and the second management unit 51 are connected with the reporting means 212 in the terminal unit 20 via the second transmission medium 40.

Figure 2:
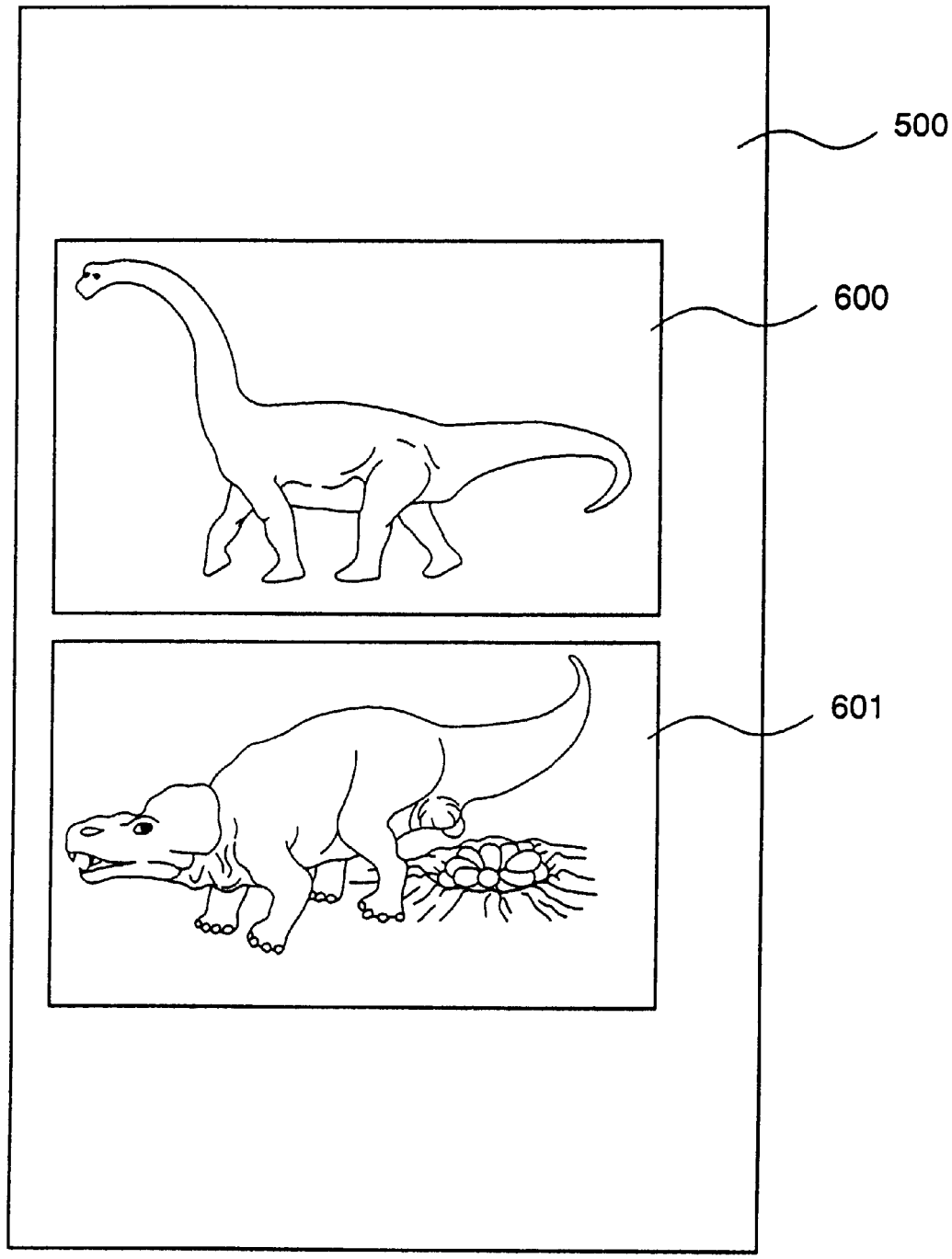
FIG. 2 is a diagram illustrating an example of digital information.

A description is given of the digital information, management information, and synthetic information employed in this system. FIG. 2 is a digram illustrating an example of digital information. In FIG. 2, digital information 500 consists of a series of still pictures, i.e., a first scene 600 and a second scene 601.

Figure 3:
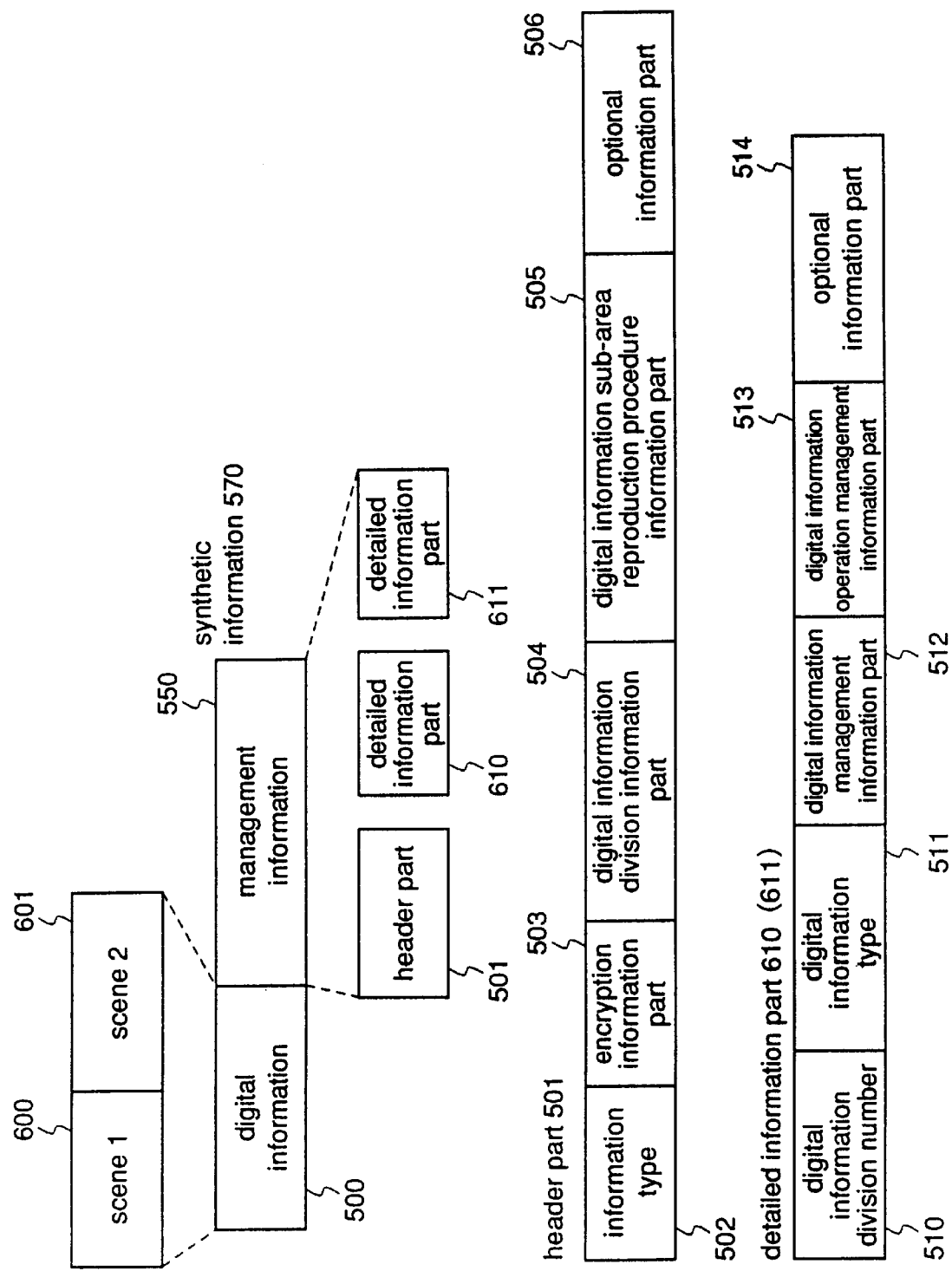
FIG. 3 is a digram for explaining management information and synthetic information.

FIG. 3 shows examples of management information and synthetic information. Management information is generated for each digital information. In FIG. 3, management information 550 corresponds to the digital information 500. The digital information 500 and the management information 550 are synthesized by the synthesis means 202, generating synthetic information 570. The management information 550 consists of a header part 501 and detailed information parts 610 and 611.

The header part 501 consists of the following sub-parts: an information type 502 showing that this information is management information; an encryption information part 503 showing information used when the following information contents are encrypted; a digital information division information part 504 showing information for dividing the digital information 500 into sub-areas; a digital information sub-area reproduction procedure information part 505 showing reproduction procedures of the sub-areas into which the digital information 500 is divided; and an optional information part 506 which is a spare area for extension.

The digital information 500 is divided into sub-areas according to information included in the management information, and this information relating to the division is included in the division information part 504. In this case, the contents of the division information show "The first sub-area is the first scene 600" and "The second sub-area is the second scene 601". In this example, the area-division according to the management information is identical to the division of the original still picture information into two scenes. However, digital information in which two scenes are digitized and united may be divided arbitrary.

The sub-areas of the digital information are reproduced in the order according to information included in the management information. Regardless of the order of the original scenes, it is possible to instruct the reproduction in an arbitrary order using the sub-area reproduction procedure information part 505 included in the management information.

It is assumed that there are two kinds of reproduction procedures, i.e., a first reproduction procedure for reproducing only the first scene 600 (first sub-area) and a second reproduction procedure for reproducing only the second scene 601 (second sub-area). In this case, the contents of the sub-area reproduction procedure information part 505 show "The first reproduction procedure is for reproducing the first sub-area" and "The second reproduction procedure is for reproducing the second sub-area".

A detailed information part is generated for each of the sub-areas of the digital information. So, the number of the detailed information parts is equal to the number of the sub-areas. In this example, since the number of the sub-areas is two, a detailed information part 610 relating to the first sub-area and a detailed information part 611 relating to the second sub-area are generated. The detailed information part 610 (611) comprises the following sub-parts: a digital information division number 510 showing the sub-area; a digital information type 511 showing the type of the digital information; a digital information management information part 512 including information relating to intellectual property right such as copyright; a digital information operation management information part 513 comprising instructions relating to use of the digital information; and an optional information part 514 which is a spare area for extension.

With respect to the contents of the detailed information part 610, assumed that the digital information division number 510 shows "first sub-area", the digital information type 511 shows "still picture", the management information part 512 shows "name of copyright holder" and "Copy generation is original", the operation management information part 513 shows "When reproduced, it is reported to the first management unit 50 at a first designated time" and "Copy is permitted and, when copied, it is reported to the first management unit 50 at the first designated time".

With respect to the contents of the detailed information part 611, assumed that the digital information division number 510 shows "second sub-area", the digital information type 511 shows "still picture", the management information part 512 shows "name of copyright holder" and "Copy generation is original", the operation management information part 513 shows "When reproduced, it is reported to the second management unit 51 at a second designated time" and "Copy is not permitted".

A description is given of the procedure of information management by the system according to this first embodiment.

First, in the supply unit 10, the digital information generating means 100 generates the digital information 500 shown in FIG. 2, and the management information generating means 201 generates the management information 550 shown in FIG. 3. The digital information 500 and the management information 550 are synthesized by the synthesis means 202 to generate synthetic information 570, and the synthetic information 570 is output from the output means 101 toward the terminal unit 20.

The synthetic information 570 is transmitted through the first transmission medium 30 to the terminal unit 20 and received by the receiving means 102. Then, the management information separating means 210 separates the management information 550 from the synthetic information 570, interprets the encryption information part 503 of the header part 501, decrypts the following contents on the basis of the interpretation, and outputs the decrypted contents to the management information processing means 213. In the terminal unit 20, preparation for use of the digital information by the user is completed.

Figure 4:
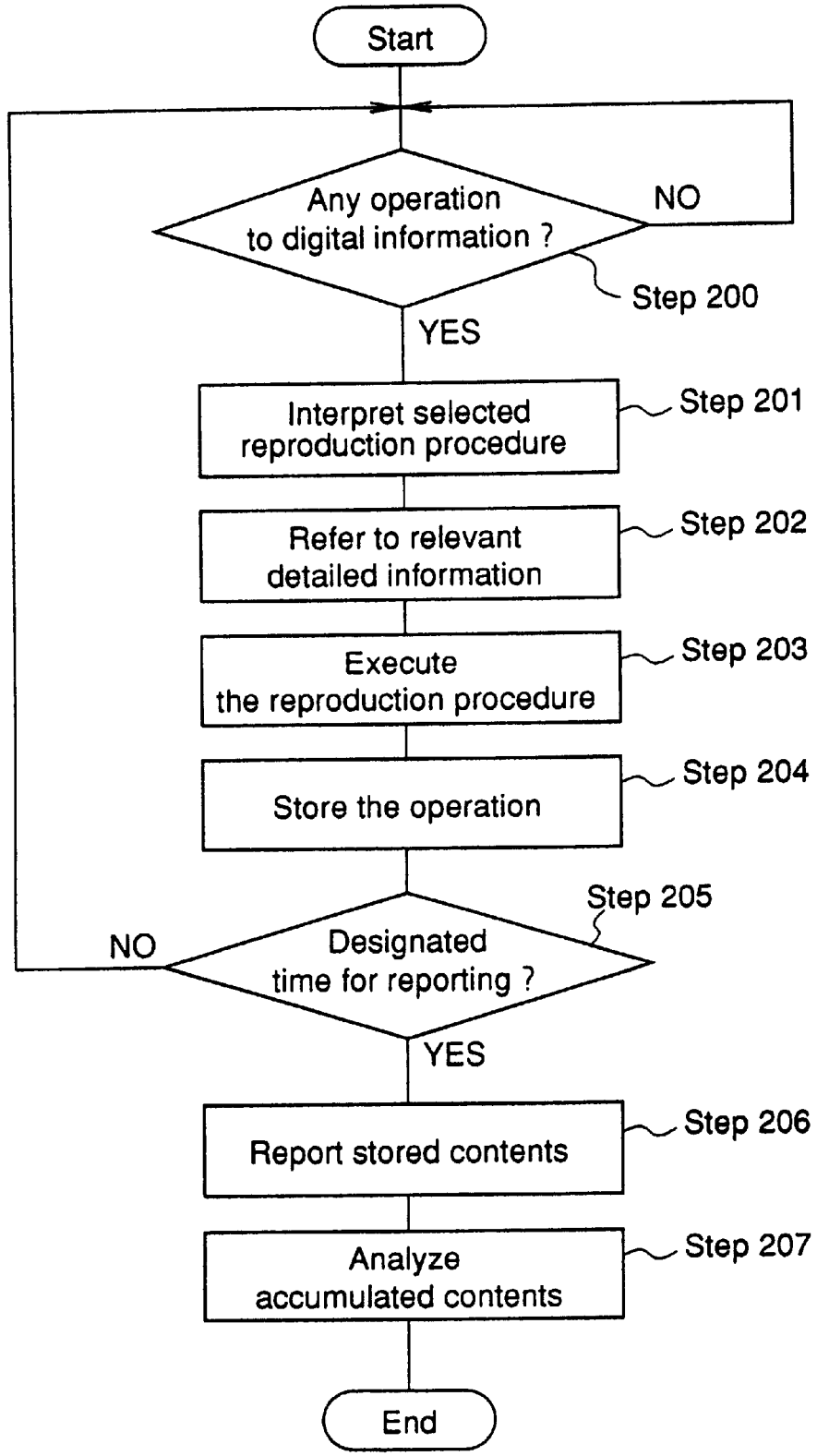
FIG. 4 is a flowchart illustrating a procedure of information management by the system shown in FIG. 1.

Hereinafter, the procedure for management will be described according to a flowchart shown in FIG. 4.

In step 200, the terminal unit 20 judges whether the user has made an operation or not. If not, the terminal unit 20 stands by for user's operation. The user instructs the operating means 103 to reproduce (playback) the digital information 500, and selects one of the first and second reproduction procedures of the digital information 500. Here, assumed that the user selects the first reproduction procedure.

With the user's operation, step 201 is executed. More specifically, the management information processing means 213 detects which one of the two reproduction procedures is selected by the operating means 103, and interprets the selected reproduction procedure that is described in the sub-area reproduction procedure information part 505 in the header part 501 included in the management information 550 shown in FIG. 3. The management information processing means 213 finds that "The first reproduction procedure is to reproduce the first sub-area" from the contents of the sub-area reproduction procedure information part 505, and that "The first sub-area is the first scene 600" from the contents of the division information part 504.

In step 202, referring to the detailed information part relating to the target sub-area, detailed information relating to the user's operations to the sub-area is investigated. Since the target sub-area is the first sub-area, the management information processing means 213 finds that "When the first sub-area is reproduced, it must be reported to the first management unit 50" from the contents of the operation management information part 513 in the detailed information part 610.

Among the contents of the operation management information part 513, a portion relating to reporting to the management unit is sent from the management information processing means 213 to the reporting means 212. The reporting means 212 retains information that "The reproduction must be reported to the first management unit 50 at a first designated time".

In step 203, the management information processing means 213 executes the selected reproduction procedure, whereby the first scene is reproduced. On the other hand, in step 240, the management information processing means 213 stores the fact that "The first sub-area has been reproduced", with the time obtained from the clock function 106, in the report contents storage means 211.

In step 205, the reporting means 212 checks the clock function 106 to know whether the present time is the designated time for reporting, i.e., compares the present time with the first designated time. When the present time is not the time for reporting, the system returns to step 200. When the time for reporting has come, step 206 is executed to report the reproduction to the designated management unit.

The reported contents are transmitted through the transmission medium 40 to the accumulating means 220 in the designated management unit. In step 207, the accumulating means 220 temporarily stores the reported contents in the accumulated contents storage means 109 and, thereafter, analyzes the accumulated contents.

When the second reproductoin procedure is selected in step 200, steps 201 to 207 are similar to those described above. In this case, according to the contents of the operation management information part 513 in the detailed information part 611, "The second sub-area has been reproduced" is reported at a second designated time, by the reporting means 212, to the accumulating means 220 in the management unit 51.

A description is given of a case where the user instructs the operating means 103 to copy the digital information and then selects the reproduction procedure. In step 202, referring to the operation management information part 513 in the detailed information part 610 or 611, when the user selects the first reproduction procedure, the management information processing means 213 finds that "copy permission" is included in the contents of the operation management information part 513 in the first detailed information part 610 and, in step 203, the processing means 213 performs copy simultaneously with reproductoin. At this time, in the management information synthesized with the copy of the digital information, in place of "Copy generation is original", "Copy generation is the first generation" is written in the contents of the digital information management information part 512 in the detailed information part 610.

According to the contents of the operation management information part 513, in step 205, "The first sub-area is copied" is sent at the first designated time to the accumulating means 220 in the management unit 50.

On the other hand, when the second reproduction procedure is selected, in step 202, the management information processing means 213 refers to the detailed information part 611 and finds that "copy inhibit" is included in the contents of the operation management information part 513, so that copy is not executed in step 203.

FIGS. 5(a) and 5(b) show how the report contents are processed when the digital information is used as mentioned above. When the digital information is sued as shown in FIG. 5(a), report contents are stored in the report contents storage means 211 as shown in FIG. 5(b). For example, when the first designated time is 00:00:00 on the 2nd of April and the second designated time is 12:00:00 on the 2nd of April, corresponding contents are taken out by the reporting means 212 and sent to the management units, as shown in FIG. 5(b).

Assuming that the user has reproduced the first sub-area one-hundred times, copied the first sub-area five times, and reproduced the second sub-area one time, in the analysis of accumulated contents in step 207, one-hundred reproduction time stamps and five copy time stamps of the first sub-area are stored in the accumulated contents storage means 109 in the management unit 50 while one reproduction time stamp of the second sub-area is stored in the accumulated contents storage means 109 in the management unit 51.

As described above, in the digital information supply and management system according to the first embodiment of the invention, when the supply unit 10 generates digital information by the digital information generating means 100, management information corresponding to the digital information is generated by the management information generating means 201. The management information contains information relating to division of the digital information into sub-areas, and information designating reproduction procedures of the respective sub-areas. Further, the management information includes a digital information operation management information part which designates a management unit to which the terminal unit 20 should report the contents of operations performed to the digital information. When the management information processing means 213 in the terminal unit 20 interprets the management information, the digital information is reproduced, area by area, according to the division and reproduction information included in the management information. Further, according to the designation of the digital information operation management information part, the contents to be reported are stored in the report contents storage means 211 and, when a designated time for reporting comes, the reporting means 212 sends the contents to the designated management unit.

In the management unit, the restricted contents sent from the terminal unit 20 according to the instruction of the management information are accumulated. Since the division and reproduction of the digital information are designed using the management information, flexible utilization of the digital information is realized. Furthermore, since the accumulating means 220 in each management unit can narrow the target of accumulation in advance, the work-load for analysis in the management unit can be reduced.

Embodiment 2

Figure 6:
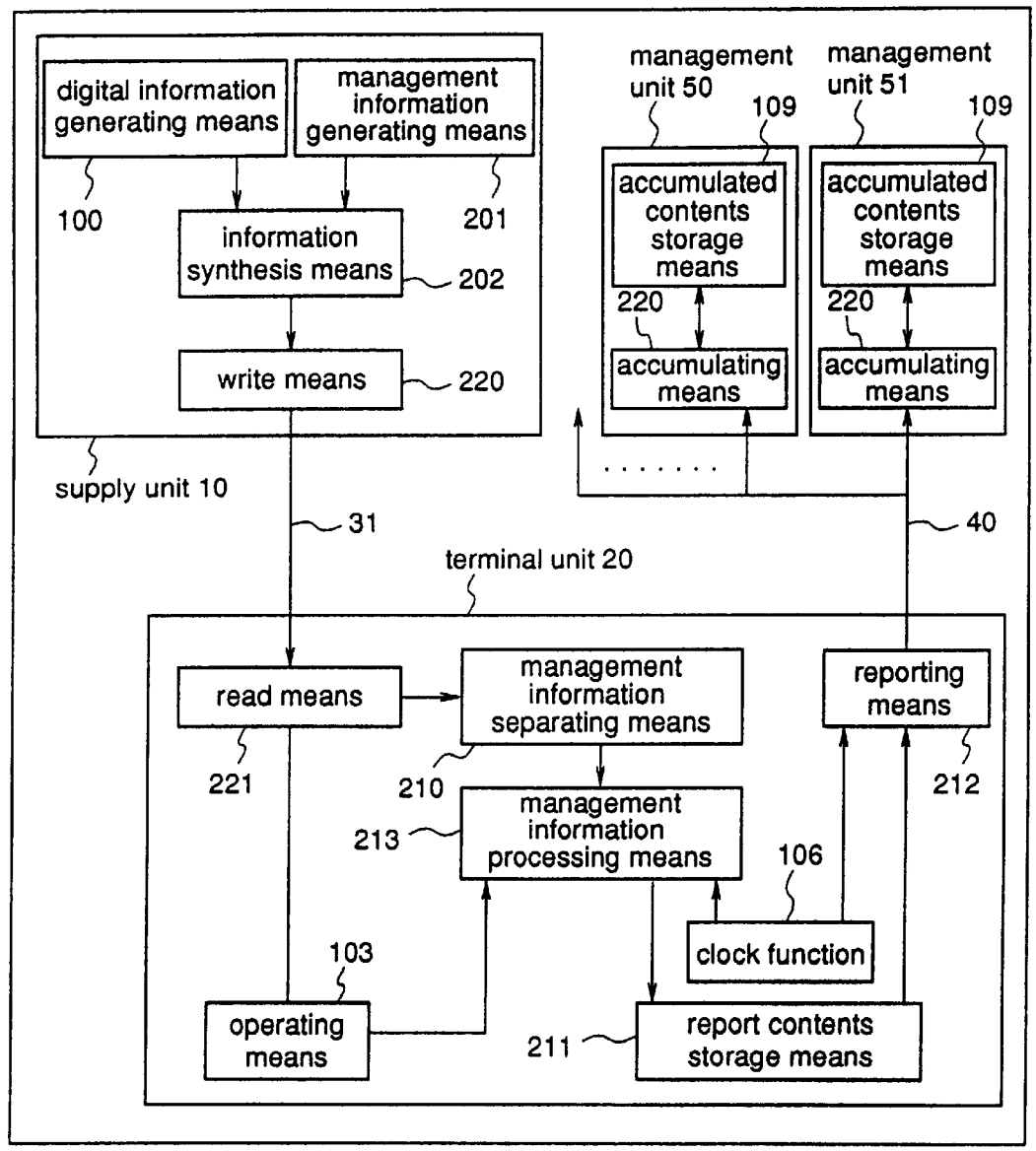
FIG. 6 is a block diagram illustrating a structure of a digital information supply and management system according to a second embodiment of the invention.

FIG. 6 is a block diagram illustrating a structure of a digital information supply and management system according to a second embodiment of the present invention. The system according to this second embodiment is fundamentally identical to the system according to the first embodiment except that the transmission medium 31 is a recording medium like a compact disk or an optical disk, the supply unit 10 has a write means 220 in place of an output means, and the terminal unit 20 has a read means 221 in place of a receiving means. Other constituents of the system are identical to those described for the first embodiment and, therefore, do not require repeated description.

A description is given of the operation of the system so constructed. In the supply unit 10, the management information generating means 201 generates management information corresponding to digital information generated by the digital information generating means 100. The synthesis means 202 synthesizes the digital information and the management information to generate synthetic information. The write means 220 writes the synthetic information in the recording medium 31. The recording medium 31 having the synthetic information is distributed to the user through a store or by mailing, and the user uses the recording medium 31 in the terminal unit 20.

The operations in the terminal unit 20 and the management units 50 and 51 are identical to those described for the first embodiment except that the read means 221 reads the synthetic information from the recording medium 31 whereas the synthetic information is received by the receiving means in the first embodiment.

As described above, in the digital information supply and management system according to this second embodiment, even when a portable recording medium is employed in place of a radio wave or a communication line, it is possible to realize flexible utilization of digital information and to facilitate analysis in the management unit. Furthermore, such a portable recording medium significantly reduces restriction on time and space relating to transmission of digital information, leading to an increase in convenience when the user stores or repeated uses the digital information.

Embodiment 3

Figure 7:
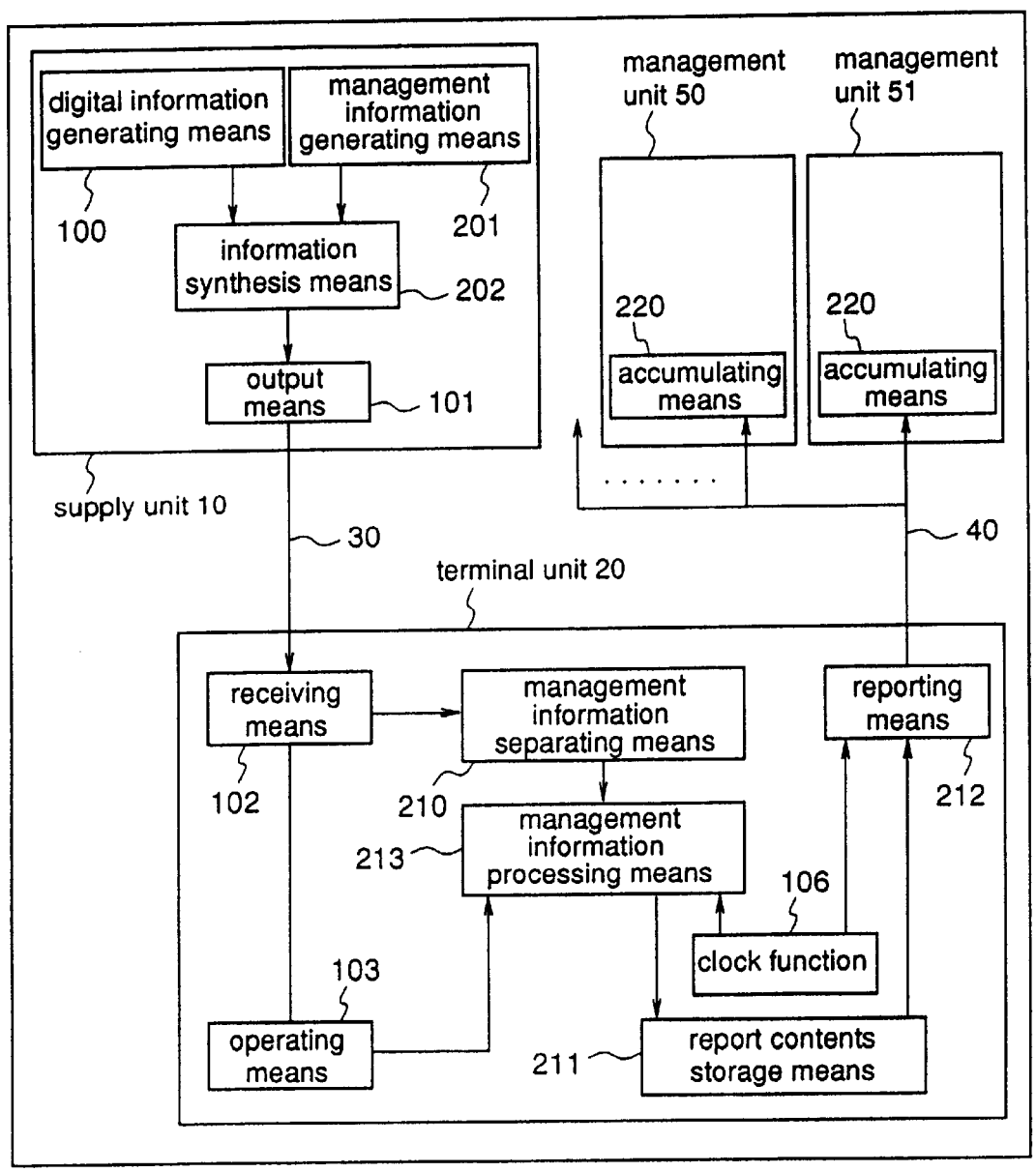
FIG. 7 is a block diagram illustrating a structure of a digital information supply and management system according to a third embodiment of the invention.

FIG. 7 is a block diagram illustrating a digital information supply and management system according to a third embodiment of the present invention. This system is fundamentally identical to the system according to the first embodiment except that the management units 50 and 51 include no accumulated contents storage means. Other constituents of the system are identical to those already described for the first embodiment and, therefore, do not require repeated description. Further, digital information and management information employed in this system are identical to those shown in FIG. 3 except that the digital information operation management information part 513 in the detailed information part 610 shows "When copied, it is reported to the first management unit 50 at a first designated time".

The system according to this third embodiment operates in the same manner as the system according to the first embodiment except when the terminal unit 20 reports the operational contents to the management unit 50 according to the contents of the digital information operation management information part 513 included in the management information. So, only the reporting operation will be described hereinafter.

Figure 5:
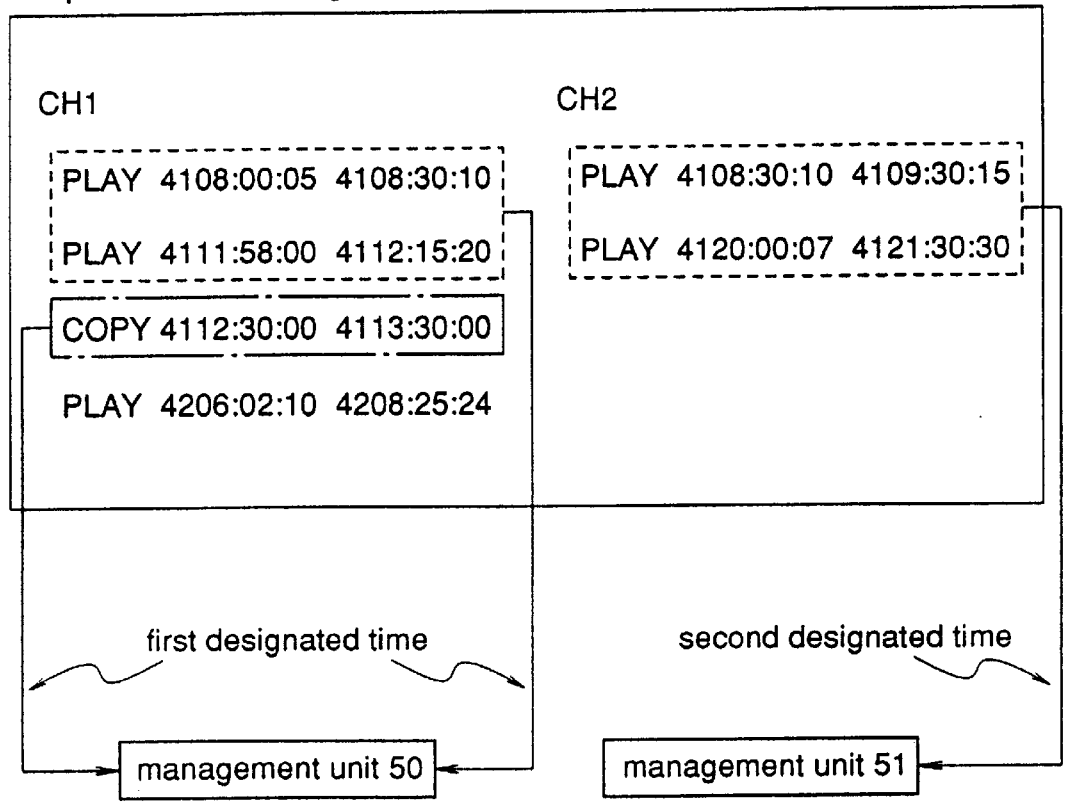
FIGS. 5(a) and 5(b) are diagrams for explaining information management by the system shown in FIG. 1.
Figure 8:
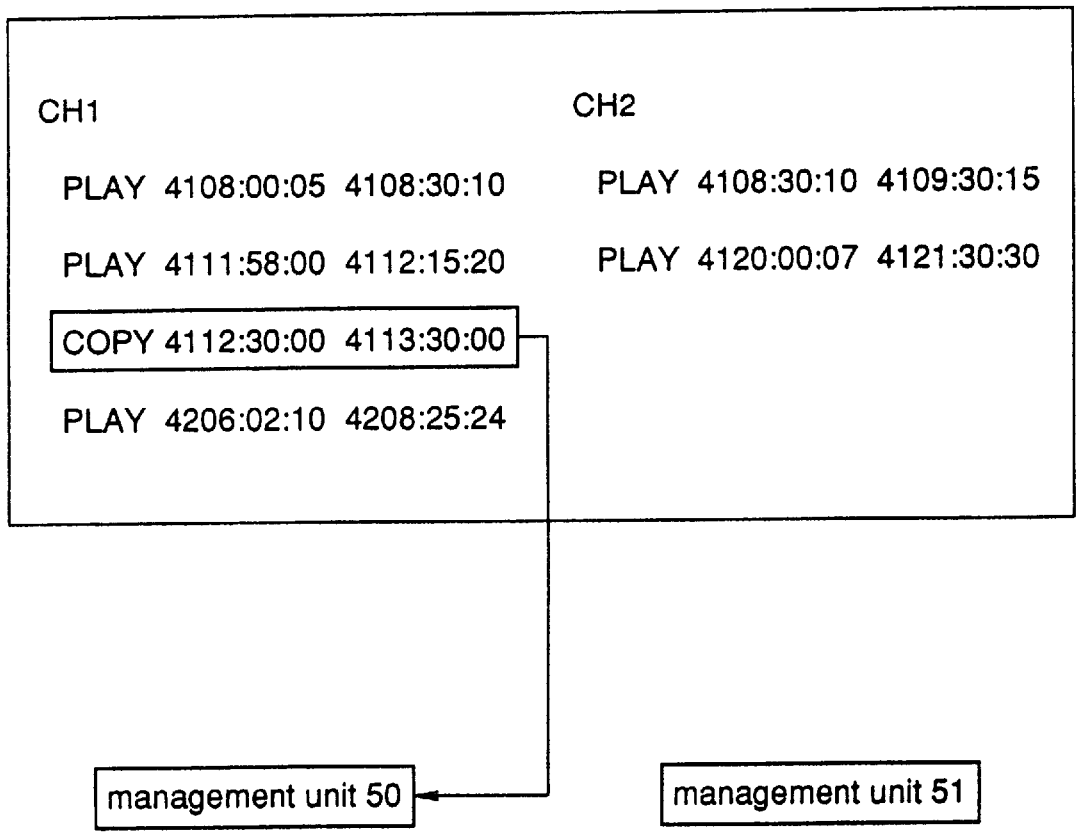
FIGS. 8(a) and 8(b) are diagrams for explaining information management by the system shown in FIG. 7.

Assuming that the same operations as mentioned for the first embodiment are performed in the terminal unit 20 as shown in FIG. 8(*a*), the contents stored in the report contents storage means 211 (FIG. 8(*b*)) are identical to those according to the first embodiment (FIG. 5(*b*)). However, there is a difference in the manner of reporting the stored contents according to the digital information operation management information part 513, i.e., the reporting is performed as shown in FIG. 8(*b*) in this third embodiment while it is performed as shown in FIG. 5(*b*) in the first embodiment.

More specifically, in the first embodiment, both of "reproduction" and "copy" relating to the digital information in the first sub-area are reported to the management unit 51 as shown in FIG. 5(*b*). Therefore, when accumulation about "utilization of digital information in the first sub-area" is desired, it is realized simply by counting alone. However, when accumulation of the contents of each operation, i.e., "reproduction only" or "copy only", is desired, it is necessary to store the report contents temporarily in the accumulated contents storage means 109 for analysis.

In contrast with the first embodiment, according to this third embodiment, only the contents relating to "copy" of the digital information is reported to the management unit 50 as shown in FIG. 8(*b*). Therefore, in the management unit 50, the contents relating to "copy of the first sub-area" are accumulated by only counting with the accumulating means 220.

As described above, in the digital information supply and management system according to the third embodiment, the operational contents to be reported to the management unit are limited in advance in the digital information operation management information part included in the detailed information part of the management information. Therefore, in the management unit, it is not necessary to temporarily store the contents in the accumulated contents storage means before analysis, leading to speedy analysis. In addition, since the accumulated contents storage means, which is implemented by an expensive recording medium, is dispensed with, the size and cost of the management unit are reduced.

As desired, the management units may be provided corresponding to the respective items for which accumulation is required, for example, "reproduction of the first region", "reproduction of the second region" and so on. Accordingly, when the number of the items for which accumulation is required is small, the system according to this third embodiment that realizes an inexpensive management unit and speedy accumulation is suitable. Conversely, when there are many items, the system according to the first embodiment is suitable.

Embodiment 4

Figure 9:
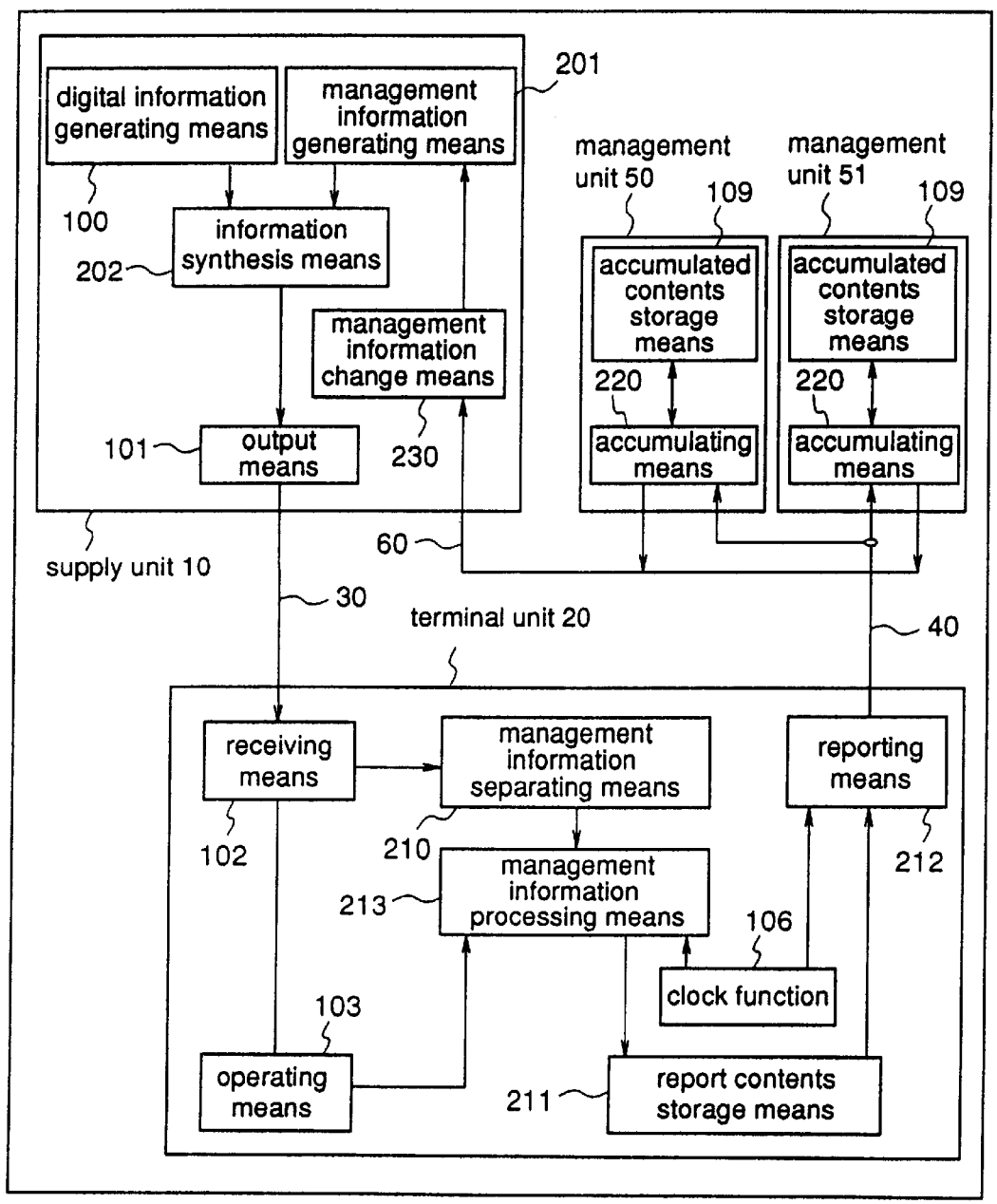
FIG. 9 is a block diagram illustrating a structure of a digital information supply and management system according to a fourth embodiment of the invention.

FIG. 9 is a block diagram illustrating a structure of a digital information supply and management system according to a fourth embodiment of the present invention. This system is fundamentally identical to the system according to the first embodiment except that the supply unit 10 includes a management information change means 230, and the accumulating means 220 in the management unit 50 (51) is connected through the transmission medium 60 to the management information change means 230, providing a loop for feeding a change in the management information by the change means 230 back to the management information generating means 201. The transmission medium 60 is implemented by a communication line, such as a cable or a telephone line, or a radio wave. Other constituents of this system are identical to those already described for the first embodiment and, therefore, do not require repeated description. Digital information and management information employed in this system are identical to those shown in FIG. 3.

A description is given of the operation of the system according to the fourth embodiment.

In this system, the accumulating result obtained by the accumulating means 220 is transmitted through the transmission medium 60 to the management information change means 230 in the supply unit 10. In the management information change means 230, a setting relating to change of the management information according to the accumulating result is made in advance. This setting is, for example, to change the reproduction procedures so that only sub-areas with relatively high popularity ratings are reproduced, according to popularity records of the respective sub-areas of the digital information.

Figure 10:
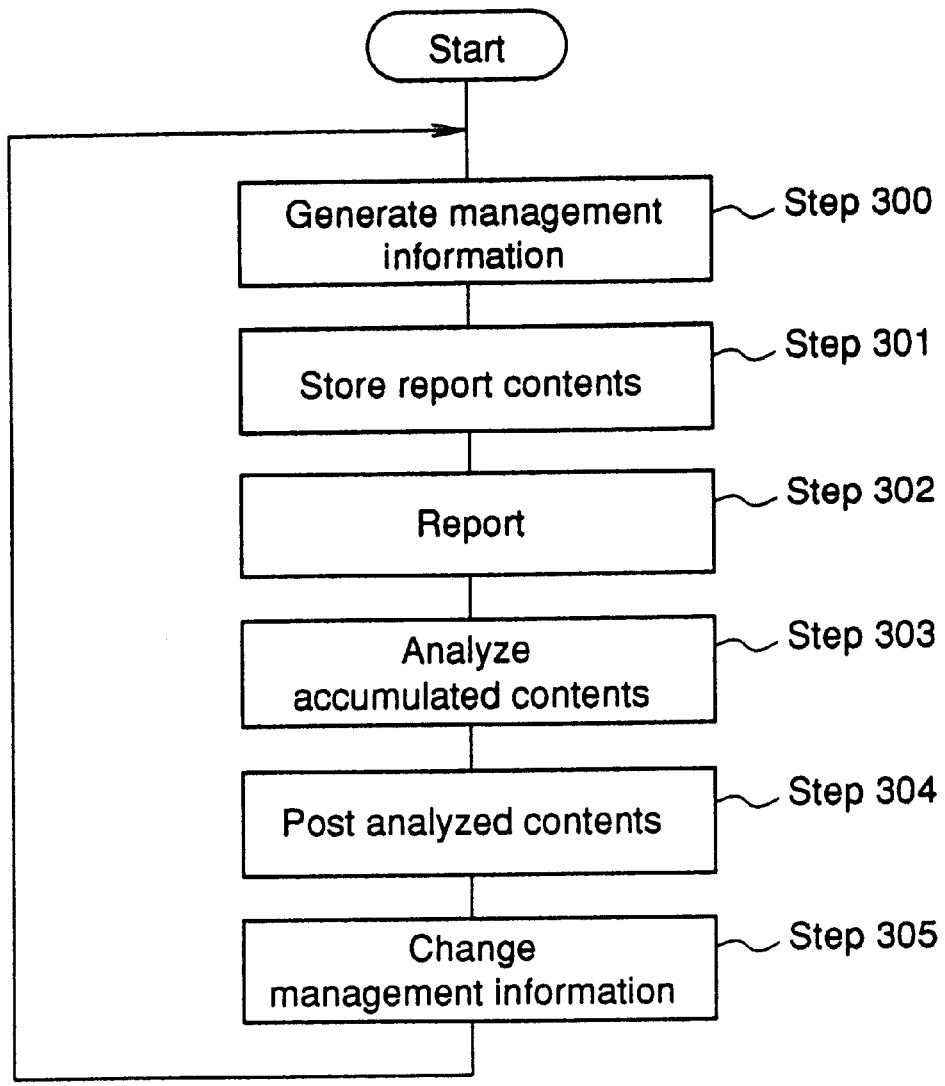
FIG. 10 is a flowchart illustrating a procedure of information management by the system shown in FIG. 9.
Figure 11:
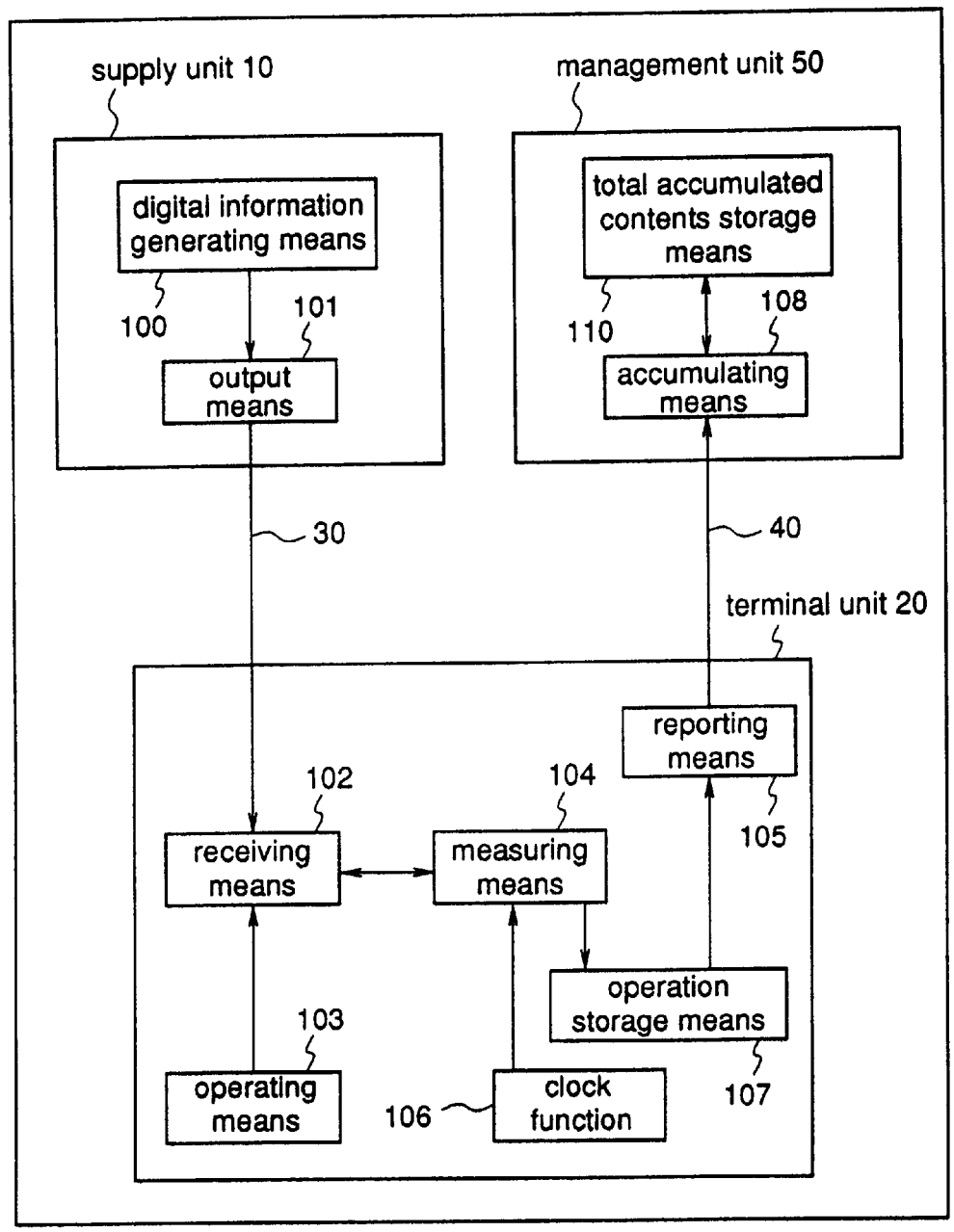
FIG. 11 is a block diagram illustrating a structure of a conventional information recording device.
Figure 12:
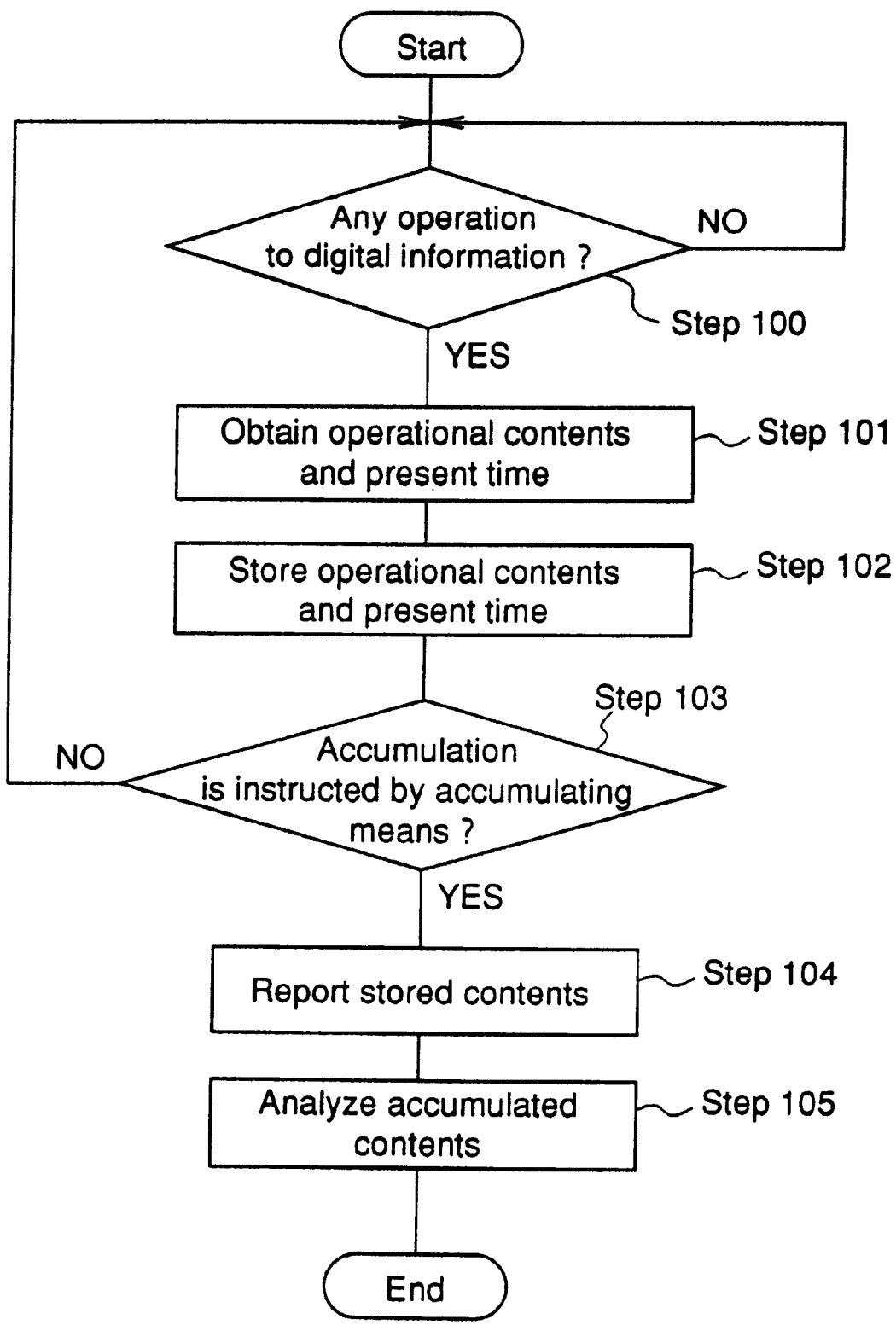
FIG. 12 is a flowchart illustrating a procedure of information management by the conventional device.

A description is now given of the operation of this system when the reproduction procedures of the management information are changed, using FIG. 10. FIG. 10 is a flowchart for explaining a loop work from output of the management information, through report and analysis of the operational contents, to change of the management information.

In step 300, the management information generating means 201 in the supply unit 10 generates management information, and the output means 101 outputs the management information. In step 301, the report contents storage means 211 in the terminal unit 20 stores contents to be reported according to the management information. Like the first embodiment, it is assumed that the stored contents are one-hundred times reproductoin of the first sub-area, five times copy of the first sub-area, and one time reproduction of the second sub-area.

In step 302, the reporting means 212 reports the contents to the corresponding management unit. In step 303, the accumulating means 220 in the management unit analyzes the accumulated contents. In step 304, the contents are posted through the transmission medium 60 to the management information change means 230 in the supply means 10. In step 305, the management information change means 230 decides that the popularity rating of the second sub-area is low from the fact that the second sub-area has been reproduced only one time while the first sub-area has been reproduced one-hundred times, and instructs the management information generating means 201 to stop reproduction of the second sub-area hereafter. Receiving the instruction, the management information generating means 201 generates the management information 550 in which the contents of the digital information sub-area reproduction procedure information part 505 in the header part 501 are restricted to "The first reproduction procedure is to reproduce the first sub-area". Therefore, hereafter, the reproduction procedure selected in the terminal unit 20 is only reproduction of the first sub-area.

As described above, in the digital information supply and management system according to this fourth embodiment, the management unit is connected with the supply unit by the communication medium, and the management information change means in the supply unit instructs the management information generating means to change the management information, according to the accumulating result sent from the management unit, whereby the analysis result obtained in the management unit is fed back to the supply unit in a short time. Therefore, various changes relating to supply of the digital information are performed effectively and certainly, with the user's requests reflected.

While in this fourth embodiment the first, second, and third transmission media 30, 40, and 60 are described as separated ones to facilitate the description, these three media, or two of them, may be implemented by a single transmission medium. In this case, however, the second and third transmission media 40 and 60 are desired to have sufficient transmission rates and capacities. Further, such a common transmission medium can be realized by applying bidirectional media like digital CATV.

Moreover, the supply unit and the management unit may be located apart from each other. However, these units may be located closely to make a supply and management center, or these units may be united in a supply and management unit.

What is claimed is:

1. A digital information supply and management system comprising a supply unit, a management unit, and a terminal unit, in which digital information including digital video and audio information is supplied from the supply unit to the terminal unit, and the management unit manages utilization of the digital information in the terminal unit;

said supply unit comprising:
 digital information generating means for generating the digital information;
 management information generating means for generating management information for the digital information, said management information comprising a header part and a detailed information part, said header part including a digital information division information part relating to division of said digital information into plural sub-areas, said detailed information part including a digital information operation management information part relating to the contents of an operation to the digital information; and
 information synthesis means for synthesizing the digital information and the management information to generate synthetic information;

said management unit comprising:
 accumulating means for receiving reported contents from the terminal unit;

said terminal unit comprising:
 receiving means for receiving the synthetic information supplied from the supply unit;
 management information separating means for separating the management information from the synthetic information;
 management information processing means for processing the management information;
 report contents storage means for storing contents to be reported to the management unit, corresponding to the management information; and
 operating means for accepting an operation by a user to the digital information.

2. The system of claim 1 wherein the management unit further comprises accumulated contents stored means for storing reported contents from the terminal unit.

3. The system of claim 1 wherein the management information generating means included in the supply unit is connected with the accumulating means included in the management unit through a transmission medium.

4. The system of claim 1 wherein at least a portion of the management information is encrypted, and the header part includes an encryption information part relating to the encryption.

5. The system of claim 1 wherein the header part includes a digital information sub-area reproduction procedure information part that designates plural reproduction procedures in the terminal unit for the respective sub-areas into which the digital information is divided according to the digital information division information part.

* * * * *